United States Patent
Sevelsted et al.

(10) Patent No.: US 10,895,328 B2
(45) Date of Patent: Jan. 19, 2021

(54) HYDRAULIC STEERING UNIT

(71) Applicant: Danfoss Power Solutions ApS, Nordborg (DK)

(72) Inventors: Nils E. Sevelsted, Sønderborg (DK); Ylnghui Liu, Nordborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 16 days.

(21) Appl. No.: 16/524,747

(22) Filed: Jul. 29, 2019

(65) Prior Publication Data
US 2020/0032916 A1    Jan. 30, 2020

(30) Foreign Application Priority Data
Jul. 30, 2018 (DE) .......................... 10 2018 113 952

(51) Int. Cl.
*F16K 15/04* (2006.01)
*B62D 3/14* (2006.01)

(52) U.S. Cl.
CPC .............. *F16K 15/044* (2013.01); *B62D 3/14* (2013.01); *Y10T 137/7842* (2015.04)

(58) Field of Classification Search
CPC ................. B62D 3/14; Y10T 137/7842; Y10T 137/7846; Y10T 137/7838
See application file for complete search history.

(56) References Cited

U.S. PATENT DOCUMENTS

| | | | | |
|---|---|---|---|---|
| 1,359,988 A | * | 11/1920 | Hansen | F01B 25/00 137/110 |
| 1,401,223 A | * | 12/1921 | Wittenmeier | F04B 39/1006 137/331 |
| 1,512,597 A | * | 10/1924 | Harmon | F02M 1/00 137/512 |
| 1,602,647 A | * | 10/1926 | Worthington | F16K 1/14 137/512.3 |
| 1,744,357 A | * | 1/1930 | Brice | F01B 25/00 137/509 |
| 1,884,550 A | * | 10/1932 | Boynton | E21B 43/123 137/155 |
| 2,004,097 A | * | 6/1935 | Hollingshead | F01B 25/00 137/509 |
| 2,006,141 A | * | 6/1935 | Hussey | F22B 37/446 137/314 |
| 2,043,453 A | * | 6/1936 | Vickers | G05D 16/024 137/469 |

(Continued)

FOREIGN PATENT DOCUMENTS

| | | |
|---|---|---|
| DE | 102006010706 A1 | 9/2007 |
| EP | 1 291 563 A2 | 3/2003 |
| JP | S6187269 U | 6/1986 |

OTHER PUBLICATIONS

Indian First Examination Report for Application No. 201914014856 dated Jul. 15, 2020.

*Primary Examiner* — Marina A Tiet Jen
*Assistant Examiner* — Frederick D Soski
(74) *Attorney, Agent, or Firm* — McCormick, Paulding & Huber PLLC

(57) ABSTRACT

A hydraulic steering unit is described comprising a housing (1) and a non-return valve (2) having a ball (3) and a valve seat (4) at an end of a channel (5) in the housing (1), wherein a movement of the ball (3) away from the valve seat (4) is limited by an abutment (7) in the channel (5). Such a steering unit should have a non-return valve which can be produced with low costs. To this end the abutment (7) extends transversely through the channel.

20 Claims, 1 Drawing Sheet

(56) References Cited

U.S. PATENT DOCUMENTS

| | | | | |
|---|---|---|---|---|
| 2,044,629 A * | 6/1936 | Parker | F16K 15/042 | 137/513 |
| 2,101,316 A * | 12/1937 | Kettnich | F24D 19/081 | 137/198 |
| 2,306,012 A * | 12/1942 | Campbell | F16K 15/042 | 137/512 |
| 2,310,677 A * | 2/1943 | Campbell | G05D 16/10 | 137/115.18 |
| 2,404,796 A * | 7/1946 | Grant, Jr. | F15B 13/0405 | 137/596.15 |
| 2,444,182 A * | 6/1948 | Calvin | F16K 15/042 | 137/512.3 |
| 2,467,434 A * | 4/1949 | Kuplec | G05D 16/2066 | 91/417 R |
| 2,471,382 A * | 5/1949 | Althouse, Jr. | E21B 33/14 | 166/194 |
| 2,475,739 A * | 7/1949 | Gustav | F04B 53/12 | 417/459 |
| 2,497,758 A * | 2/1950 | Campbell | F16N 21/02 | 184/105.3 |
| 2,634,743 A * | 4/1953 | Audemar | F15B 7/003 | 137/112 |
| 2,646,062 A * | 7/1953 | Nixon | E21B 43/123 | 137/155 |
| 2,649,115 A * | 8/1953 | Deardorff | G05D 16/18 | 137/488 |
| 2,651,549 A * | 9/1953 | Ross | B65G 51/03 | 414/676 |
| 2,725,074 A * | 11/1955 | McLeod | F04B 49/035 | 137/493.9 |
| 2,738,796 A * | 3/1956 | Chadwick | F16K 17/19 | 137/43 |
| 2,757,616 A * | 8/1956 | Hill | F16K 24/042 | 417/200 |
| 2,809,659 A * | 10/1957 | Gillespie | F16K 17/196 | 137/512 |
| 2,847,937 A * | 8/1958 | Garvey | E05F 15/57 | 137/87.04 |
| 2,903,014 A * | 9/1959 | Sheppard | F02M 59/462 | 137/539 |
| 3,170,525 A * | 2/1965 | Gunnar | E21B 21/00 | 175/218 |
| 3,183,992 A * | 5/1965 | Brueder | B62D 3/14 | 180/423 |
| 3,263,425 A * | 8/1966 | Rohde | F15B 7/006 | 60/475 |
| 3,447,564 A * | 6/1969 | North | F16K 15/044 | 137/512 |
| 3,527,250 A * | 9/1970 | Thomas | F15B 11/02 | 137/565.12 |
| 3,550,612 A * | 12/1970 | Maxon | F01P 3/205 | 137/112 |
| 3,661,167 A * | 5/1972 | Hussey | F04B 43/02 | 137/269.5 |
| 3,732,890 A * | 5/1973 | Smith | F16K 31/363 | 137/512.3 |
| 3,742,926 A * | 7/1973 | Kemp | F02M 59/462 | 123/467 |
| 3,861,414 A * | 1/1975 | Peterson, II | E21B 34/08 | 137/512.3 |
| 3,906,991 A * | 9/1975 | Haussler | F16K 15/18 | 137/630.13 |
| 4,031,619 A * | 6/1977 | Gregory | B25B 5/061 | 30/180 |
| 4,068,680 A * | 1/1978 | Sliger | F16K 15/04 | 137/512.1 |
| 4,139,469 A * | 2/1979 | Rainin | B01D 15/166 | 137/512 |
| 4,184,510 A * | 1/1980 | Murry | A61F 9/00745 | 137/512 |
| 4,217,931 A * | 8/1980 | Jaekel | F16K 15/044 | 137/503 |
| 4,282,897 A * | 8/1981 | de Mey, II | F16K 15/042 | 137/512 |
| 4,286,573 A * | 9/1981 | Nickel | F24H 9/124 | 122/14.31 |
| 4,387,736 A * | 6/1983 | Major | F04B 11/0033 | 137/512 |
| 4,392,507 A * | 7/1983 | Harris | B60K 15/03519 | 137/38 |
| 4,546,791 A * | 10/1985 | Huang | F16K 17/0406 | 137/115.25 |
| 4,567,911 A * | 2/1986 | Kedem | B62B 3/0618 | 137/454.5 |
| 4,696,161 A * | 9/1987 | Rasmussen | B62D 5/097 | 137/625.21 |
| 4,832,075 A * | 5/1989 | Dubach | F16K 15/04 | 137/512 |
| 4,846,218 A * | 7/1989 | Upchurch | F16K 15/042 | 137/544 |
| 4,856,549 A * | 8/1989 | Ueno | F16K 11/056 | 137/112 |
| 4,947,672 A * | 8/1990 | Pecora | B21F 15/06 | 81/301 |
| 5,573,033 A * | 11/1996 | Litzel | F16K 23/00 | 137/512.3 |
| 5,701,970 A * | 12/1997 | Arbjerg | B62B 5/083 | 180/417 |
| 5,782,269 A * | 7/1998 | Seaney | F16K 15/044 | 137/512.3 |
| 5,979,215 A * | 11/1999 | Lefavour | B25B 27/146 | 137/454.5 |
| 6,021,810 A * | 2/2000 | Gaillard | F04B 53/007 | 137/512 |
| 6,206,032 B1 * | 3/2001 | Hill | F16K 15/042 | 137/512 |
| 6,684,415 B1 * | 2/2004 | Kozono | E03C 1/12 | 137/512 |
| 6,968,858 B2 | 11/2005 | Kuehn et al. | | |
| 7,806,235 B1 * | 10/2010 | Roys | F16N 13/22 | 184/6.4 |
| 8,905,732 B2 * | 12/2014 | Kuttler | F04B 7/0076 | 417/505 |
| 9,188,114 B2 * | 11/2015 | Kuttler | F04B 23/106 | |
| 2004/0089347 A1 * | 5/2004 | Cavagna | F16K 17/10 | 137/491 |
| 2006/0192161 A1 * | 8/2006 | Kuna | E03C 1/0404 | 251/95 |
| 2008/0041452 A1 * | 2/2008 | Zweber | F16K 11/105 | 137/12 |
| 2008/0314449 A1 * | 12/2008 | Ho | F16K 15/063 | 137/2 |
| 2009/0301583 A1 * | 12/2009 | Mills | B60K 15/03519 | 137/539 |
| 2010/0170571 A1 * | 7/2010 | Anderson | F16K 15/042 | 137/1 |
| 2012/0128533 A1 * | 5/2012 | Deguchi | G01N 30/32 | 422/62 |
| 2012/0160335 A1 * | 6/2012 | Thyroff | F02M 21/0239 | 137/14 |
| 2014/0020772 A1 * | 1/2014 | Anderson | F16K 15/044 | 137/505.11 |
| 2015/0219234 A1 * | 8/2015 | Hobmeyr | F16K 15/044 | 251/337 |
| 2016/0040663 A1 * | 2/2016 | Herman | F16K 17/20 | 137/15.19 |
| 2016/0097486 A1 * | 4/2016 | Herman | F16K 15/044 | 184/6 |
| 2016/0281875 A1 * | 9/2016 | Sutton | F16K 15/18 | |
| 2017/0037768 A1 * | 2/2017 | Fangauer | F01P 7/14 | |
| 2017/0146139 A1 * | 5/2017 | Patterson | F16K 15/18 | |
| 2018/0156488 A1 * | 6/2018 | Evans | F16K 27/0227 | |
| 2019/0049028 A1 * | 2/2019 | Beuschel | F16K 15/183 | |

\* cited by examiner

HYDRAULIC STEERING UNIT

CROSS-REFERENCE TO RELATED APPLICATION

This application claims foreign priority benefits under U.S.C. § 119 to German Patent Application No. 102018113952.7 filed on Jul. 30, 2018, the content of which is hereby incorporated by reference in its entirety.

TECHNICAL FIELD

The present invention relates to a hydraulic steering unit comprising a housing and a non-return valve having a ball and a valve seat at an end of a channel in the housing, wherein a movement of the ball away from the valve seat is limited by an abutment in the channel.

BACKGROUND

Such a hydraulic steering unit is known, for example, from U.S. Pat. No. 4,696,161 A. The ball is held in place by a bolt which is a special turned part and therefore expensive to manufacture.

Such a non-return valve can be used in emergency situations or for eliminating kick back in the steering unit.

SUMMARY

The object underlying the invention is to provide a steering unit having a non-return valve and which can be produced with low costs.

This object is solved with a hydraulic steering unit as described at the outset in that the abutment extends transversally through the channel.

It is therefore not necessary to have a bolt with a rather complicated form which is difficult to produce. It is simply necessary to have an abutment which extends from one side of the channel into the channel.

In an embodiment of the invention both ends of the abutment are held in the housing. The abutment is firmly held and cannot be flexed even when a pressure acting on the ball is quite high.

In an embodiment of the invention the abutment is arranged out of a center line of the channel. In other words, a center line of the abutment and the center line of the channel do not coincide. This means that on one side of the abutment transverse to the direction of movement there is a larger cross section available so that the increase of flow resistance caused by the abutment is limited.

In an embodiment of the invention the abutment is formed by a check-valve. Accordingly, the hydraulic steering unit has a non-return valve (which is in principle also a check-valve) and a check-valve. The check-valve has two functions. The first function is that of an ordinary check-valve. The second function is to limit the movement of the ball.

In an embodiment of the invention the abutment is formed by at least a moveable part of the check-valve. Accordingly, the size of the abutment can be limited to avoid a too high flow resistance in the channel.

In an embodiment of the invention the check-valve comprises a valve element and a valve seat element, wherein the valve element is loaded by a spring in a direction towards the valve seat element and the spring forms at least part of the abutment. The spring is preferably in form of a screw spring.

Accordingly, the abutment is at least partly elastically deformable to avoid noise when the ball comes into contact with the abutment.

In an embodiment of the invention in a closed state of the check-valve the abutment is formed by the spring only and in an open state of the check-valve the abutment is formed additional by a part of the valve element. When the check-valve is open, there is in many cases a pressure which acts in a direction to move the ball against the valve seat against the non-return valve. On the other hand, when the non-return valve is open, there are many cases in which the check-valve is closed so that the ball is stopped by the spring of the check-valve to reduce noise.

In an embodiment of the invention the valve element is guided in the housing and in the valve seat element which is fixed in the housing. Accordingly, the valve element is guided at two positions which are remote from each other to achieve a stable alignment with respect to the valve seat even if the ball acts on the valve element with a certain force.

In an embodiment of the invention the valve element comprises a stem having a tapered section and the spring is arranged at least partly around the tapered section. In this case the spring can be elastically deformed when the ball comes in contact with the spring. This is of advantage to reduce noise. Furthermore, the stem reduces the cross section of the channel only to a small extend.

In an embodiment of the invention the spring rests against a protrusion of the valve element, wherein in a closed state of the check-valve at least part of the protrusion is in a position out of the channel. When the check-valve is closed, the protrusion does not significantly reduce the cross section of the channel.

BRIEF DESCRIPTION OF THE DRAWINGS

The invention is now described with reference to the drawing, wherein:

FIG. 1 shows part of a housing 1 of a hydraulic steering unit.

DETAILED DESCRIPTION

Figure 1:
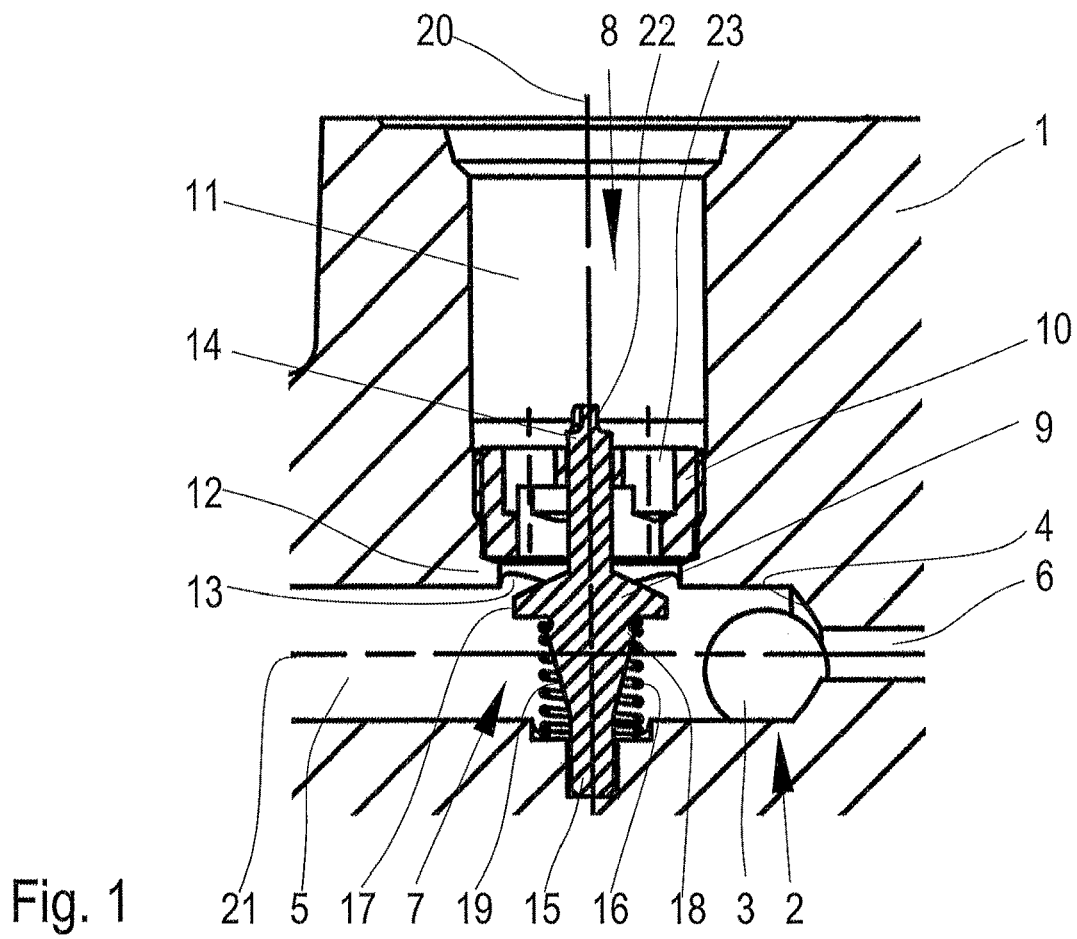
FIG. 1 shows a schematic view of a part of a hydraulic steering unit.

A non-return valve 2 is arranged in the housing 1. The non-return valve 2 comprises a ball 3 and a valve seat 4. The valve seat 4 is arranged at an end of a channel 5. When the ball 3 rests against the valve seat 4, a connection between the channel 5 and another channel 6 is interrupted. In the position of the ball 3 relative to the valve seat 4 shown, this connection is open.

The movement of the ball 3 away from the valve seat 4 is limited by means of an abutment 7. The abutment 7 is formed in the present case by parts of a check-valve 8. However, it can be replaced by a pin or dummy only which does not have the function of a check-valve.

In the embodiment shown in the figure, the check-valve 8 comprises a valve element 9 and a valve seat element 10. The valve seat element 10 is mounted in a quite large bore 11 in the housing 1 to achieve a low pressure drop over the check-valve 8.

The valve seat element 10 is fixed in the housing 1 with a certain distance to the channel 5 and rests against a step 12 surrounding an opening 13 which will be explained later.

The valve element 9 is guided with one end 14 in the valve seat element 10 and with another end 15 in the housing 1.

The valve element 9 is loaded by a spring 16 in a direction towards the valve seat element 10. The spring 16 rests against a protrusion 17 of the valve element 9. The opening 13 is slightly larger than the circumference of the protrusion 17 and has a depth corresponding to a height of the protrusion 17, so that the protrusion 17 can at least partly be accommodated in the opening 16 when the check-valve 8 is in closed position.

The valve element 9 comprises a stem 18 having a tapered section 19. The spring 16 is arranged at least partly around the tapered section 19 so that there is a gap between a part of the spring 16 and the stem 18.

The valve element 9 of the check-valve 8 is arranged eccentrically to the channel 5, i.e. a center line 20 of the valve element 9 does not run through a center line 21 of the channel 5.

When a force produced by a pressure in bore 11 exceeds a force produced by the pressure in the channel 5 plus the force of spring 16, the check-valve 8 is opened to establish a connection between the bore 11 and the channel 5. Depending on the pressure in the second channel 6 this will cause the ball 3 to move against the valve seat 4 of the not-return valve 2 to close the non-return valve 2.

On the other hand, when a force produced by the pressure in the second channel 6 and acting on the ball 3 exceeds a force generated by the pressure in the channel 5 and acting on the ball 3 the ball 3 is moved away from the valve seat 4 of the non-return valve 2. However, the movement of the ball 3 away from the valve seat 4 is limited by the spring 16, when the check-valve 8 is closed or by the spring 16 and the protrusion 17 of the valve element 9, when the check-valve 8 is open. Since the valve element 9 is in any case held stable in the housing 1, it is able to withstand a considerable force acting on the ball 3.

The protrusion 17 is through going in circumferential direction and the valve element 9 is tapered on a side facing the valve seat element 10 to achieve a low pressure drop over the check-valve 8 when the check-valve 8 is opened.

The valve seat element 10 comprises a bushing 22 which is held by arms 23. The arms 23 are arranged in a star-like manner to connect the bushing 22 to the valve seat element 10.

Figure 2:
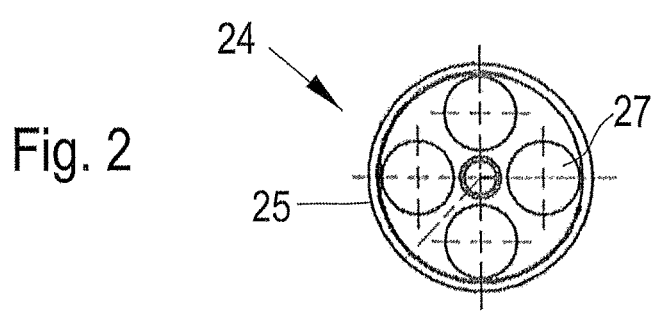
FIG. 2 a top view of a dummy.
Figures 3, 4:
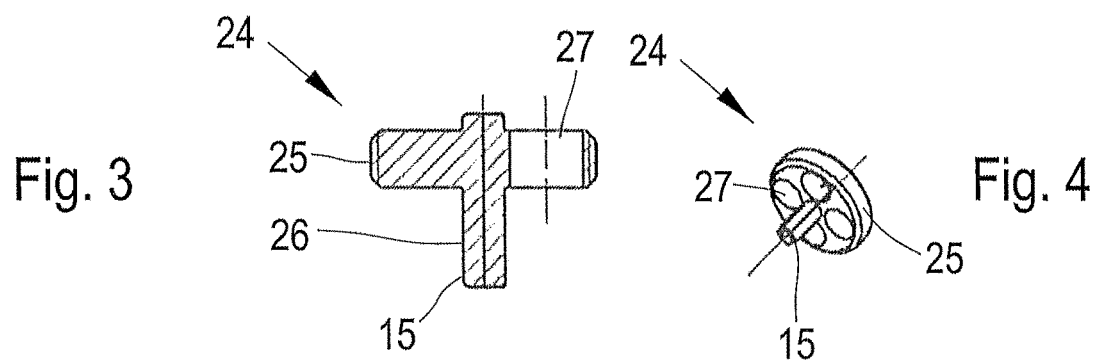
FIG. 3 a sectional view of the dummy.
FIG. 4 a perspective view of the dummy.

As mentioned above, the check valve can be replaced by a pin or dummy 24 which is shown in FIGS. 2 to 4.

The dummy 24 comprises an end 15 which is inserted into the housing 1. Furthermore, the dummy 24 comprises an enlarged section 25 which can be inserted into bore 11 until it rests against step 12. The enlarged section 25 and the end 15 are connected by means of a stem 26 which is long enough so that the end 15 can protrude into the housing 1 on the other side of the channel 5.

The enlarged section 25 comprises a number of openings 27 through which hydraulic fluid can pass.

The stem 26 forms an abutment in the channel 5 which limits the movement of ball 3 in channel 5.

Again, the dummy 24 extends transversely through the channel 5 and is fixed with both ends in the housing 1 to avoid deflections.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a housing, a non-return valve having a ball and a first valve seat at an end of a channel in the housing, and a valve extending transversely through the channel, the valve having a guiding stem, a head, a second valve seat, and a spring surrounding the guiding stem, wherein a movement of the ball away from the first valve seat is limited by a side portion of the guiding stem and/or spring extending transversely through the channel.

2. The hydraulic steering unit according to claim 1, wherein both ends of the valve are held in the housing.

3. The hydraulic steering unit according to claim 1, wherein the valve is arranged out of a center line of the channel.

4. The hydraulic steering unit according to claim 1, wherein the valve is a check-valve.

5. The hydraulic steering unit according to claim 4, wherein the side portion is formed by at least a moveable part of the check-valve.

6. The hydraulic steering unit according to claim 4, wherein the head is loaded by the spring in a direction towards the second valve seat and the spring limits the movement of the ball away from the first valve seat.

7. The hydraulic steering unit according to claim 6, wherein in a closed state of the check-valve the abutment side portion limiting movement of the ball away from the first valve seat is formed by the spring only and in an open state of the check-valve the side portion limiting movement of the ball away from the first valve seat is formed additionally by the guiding stem.

8. The hydraulic steering unit according to claim 6, wherein the guiding stem is guided in the housing and in a valve seat element which is fixed in the housing, the valve seat element comprising the second valve seat.

9. The hydraulic steering unit according to claim 6, wherein the guiding stem comprises a stem having a tapered section and the spring is arranged at least partly around the tapered section.

10. The hydraulic steering unit according to any of claim 6, wherein the spring rests against the head, wherein in a closed state of the check-valve at least part of the head check-valve at least part of the protrusion is in a position out of the channel.

11. The hydraulic steering unit according to claim 2, wherein the valve is arranged out of a center line of the channel.

12. The hydraulic steering unit according to claim 2, wherein the valve is by a check-valve.

13. The hydraulic steering unit according to claim 3, wherein the valve is by a check-valve.

14. The hydraulic steering unit according to claim 5, wherein the valve head is loaded by the spring in a direction towards the second valve seat and the spring limits the movement of the ball away from the first valve seat.

15. The hydraulic steering unit according to claim 7, wherein the guiding stem is guided in the housing and in a valve seat element which is fixed in the housing, the valve seat element comprising the second valve seat.

16. The hydraulic steering unit according to claim 7, wherein the guiding stem comprises a stem having a tapered section and the spring is arranged at least partly around the tapered section.

17. The hydraulic steering unit according to claim 8, wherein the guiding stem comprises a stem having a tapered section and the spring is arranged at least partly around the tapered section.

18. The hydraulic steering unit according to claim 7, wherein the spring rests against the head, wherein in a closed state of the check-valve at least part of the head is in a position out of the channel.

19. The hydraulic steering unit according to claim 8, wherein the spring rests against the head, wherein in a closed state of the check-valve at least part of the head is in a position out of the channel.

20. The hydraulic steering unit according to claim 9, wherein the spring rests against the head, wherein in a closed state of the check-valve at least part of the head is in a position out of the channel.

\* \* \* \* \*

UNITED STATES PATENT AND TRADEMARK OFFICE
CERTIFICATE OF CORRECTION

PATENT NO. : 10,895,328 B2
APPLICATION NO. : 16/524747
DATED : January 19, 2021
INVENTOR(S) : Nils E. Sevelsted et al.

Page 1 of 1

It is certified that error appears in the above-identified patent and that said Letters Patent is hereby corrected as shown below:

In the Claims

Column 4, Claim 10, Line 40, after "according to", please delete "any of", and on Line 42, after "part of the head", please delete "check -valveat least part of the protrusion."

Signed and Sealed this
Tenth Day of August, 2021

Drew Hirshfeld
*Performing the Functions and Duties of the
Under Secretary of Commerce for Intellectual Property and
Director of the United States Patent and Trademark Office*